(12) United States Patent
Arad

(10) Patent No.: US 12,554,904 B2
(45) Date of Patent: Feb. 17, 2026

(54) SYSTEMS AND METHODS FOR CALCULATING A TIME DURATION AND AN AMOUNT OF MATERIAL REQUIRED FOR PRINTING A THREE-DIMENSIONAL OBJECT

(71) Applicant: STRATASYS LTD., Rehovot (IL)

(72) Inventor: Nur Arad, Tel-Aviv (IL)

(73) Assignee: STRATASYS LTD., Rehovot (IL)

( * ) Notice: Subject to any disclaimer, the term of this patent is extended or adjusted under 35 U.S.C. 154(b) by 1105 days.

(21) Appl. No.: 17/617,591

(22) PCT Filed: Jun. 11, 2020

(86) PCT No.: PCT/IL2020/050650
§ 371 (c)(1),
(2) Date: Dec. 9, 2021

(87) PCT Pub. No.: WO2020/250230
PCT Pub. Date: Dec. 17, 2020

(65) Prior Publication Data
US 2022/0245299 A1    Aug. 4, 2022

Related U.S. Application Data

(60) Provisional application No. 62/860,873, filed on Jun. 13, 2019.

(51) Int. Cl.
*G06F 30/20*    (2020.01)
*G06F 113/10*   (2020.01)

(52) U.S. Cl.
CPC ......... *G06F 30/20* (2020.01); *G06F 2113/10* (2020.01)

(58) Field of Classification Search
CPC ................ G06F 30/20; G06F 2113/10
(Continued)

(56) References Cited

U.S. PATENT DOCUMENTS 9,738,033 B2    8/2017   Kritchman
10,065,376 B2   9/2018   Hakkaku
(Continued)

FOREIGN PATENT DOCUMENTS

WO    WO 2015/178443    11/2015
WO    WO 2015/199019    12/2015
(Continued)

OTHER PUBLICATIONS

Hallmann et al. (Optimization of Build Time and Support Material Quantity for the Additive Manufacturing of Non-Assembly Mechanisms, Procedia CIRP 84 (2019) 271-276) (Year: 2019).*
(Continued)

*Primary Examiner* — Iftekhar A Khan
(74) *Attorney, Agent, or Firm* — PEARL COHEN ZEDEK LATZER BARATZ LLP

(57) ABSTRACT

Systems and methods for calculating a printing time duration and an amount of material consumption required for one or more materials required for printing a tray arrangement including one or more 3D objects using a 3D printing system, including: receiving a 3D model of a tray arrangement including one or more 3D objects to be printed using a 3D printing system; and generating, based on the 3D model, a 3D digital dataset comprising a plurality of data elements arranged in a set of horizontal slices, wherein a slicing resolution of the 3D digital dataset is lower than a printing resolution of the 3D printing system.

18 Claims, 5 Drawing Sheets

(58) Field of Classification Search
USPC .......................................................... 703/6
See application file for complete search history.

(56) References Cited

U.S. PATENT DOCUMENTS

| | | | | |
|---|---|---|---|---|
| 10,166,726 | B2* | 1/2019 | Fripp | B29C 64/106 |
| 10,703,040 | B2* | 7/2020 | Nagahari | H04N 1/40 |
| 2014/0048971 | A1* | 2/2014 | Mannella | B33Y 30/00 |
| | | | | 264/129 |
| 2016/0001504 | A1* | 1/2016 | Ikeda | B29C 64/393 |
| | | | | 264/255 |
| 2016/0048609 | A1* | 2/2016 | Voris | B29C 64/386 |
| | | | | 700/98 |
| 2016/0236416 | A1* | 8/2016 | Bheda | B33Y 50/02 |
| 2017/0151726 | A1 | 6/2017 | Ikeda et al. | |
| 2017/0165919 | A1* | 6/2017 | Ohi | B29C 64/171 |
| 2017/0173886 | A1* | 6/2017 | Menchik | B29C 64/245 |
| 2017/0291373 | A1* | 10/2017 | Hara | B33Y 50/02 |
| 2017/0313048 | A1* | 11/2017 | Hakkaku | B33Y 50/02 |
| 2018/0052433 | A1* | 2/2018 | Vernon | B33Y 50/00 |
| 2018/0079149 | A1* | 3/2018 | Suresh | B29C 64/40 |
| 2018/0093417 | A1* | 4/2018 | Yaw | B29C 64/393 |
| 2018/0095450 | A1* | 4/2018 | Lappas | B33Y 10/00 |
| 2018/0117847 | A1 | 5/2018 | Ohi | |
| 2018/0117856 | A1* | 5/2018 | Ochi | B29C 64/112 |
| 2018/0126664 | A1* | 5/2018 | Okawa | H04N 1/405 |
| 2018/0147838 | A1* | 5/2018 | Harayama | B33Y 50/02 |
| 2018/0150263 | A1* | 5/2018 | Harayama | G06Q 10/10 |
| 2018/0162056 | A1* | 6/2018 | Kaneko | H04N 1/46 |
| 2018/0169936 | A1* | 6/2018 | Harayama | B29C 64/209 |
| 2018/0169953 | A1* | 6/2018 | Matusik | B29C 64/124 |
| 2018/0178444 | A1* | 6/2018 | Hakkaku | B41J 2/01 |
| 2018/0250883 | A1* | 9/2018 | Nagahari | B33Y 30/00 |
| 2018/0264741 | A1* | 9/2018 | Parker | B29C 64/112 |
| 2018/0281295 | A1* | 10/2018 | Tibbits | B33Y 70/00 |
| 2018/0304546 | A1* | 10/2018 | Hakkaku | B29C 67/00 |
| 2018/0373227 | A1* | 12/2018 | Sadusk | H04N 1/00676 |
| 2019/0022756 | A1* | 1/2019 | Ohnishi | B22F 3/24 |
| 2019/0043268 | A1* | 2/2019 | Harayama | B33Y 50/02 |
| 2019/0291184 | A1* | 9/2019 | Buller | B29C 64/20 |
| 2019/0366644 | A1* | 12/2019 | Blaier | B33Y 50/00 |
| 2020/0004225 | A1* | 1/2020 | Buller | B22F 5/04 |
| 2020/0016833 | A1* | 1/2020 | Yuwaki | B33Y 70/10 |
| 2020/0034498 | A1* | 1/2020 | Avdovic | G06F 30/00 |
| 2020/0156323 | A1* | 5/2020 | Woytowitz | B33Y 50/02 |
| 2020/0368973 | A1* | 11/2020 | Van Esbroeck | B29C 64/393 |
| 2021/0046694 | A1* | 2/2021 | Rowe | B33Y 80/00 |
| 2022/0242051 | A1* | 8/2022 | Arad | G06F 30/10 |
| 2023/0008161 | A1* | 1/2023 | Raz | G05B 19/4099 |

FOREIGN PATENT DOCUMENTS

| | | |
|---|---|---|
| WO | WO 2016/163391 | 10/2016 |
| WO | WO 2016/167239 | 10/2016 |
| WO | WO 2016/167240 | 10/2016 |
| WO | WO 2016/190342 | 12/2016 |
| WO | WO 2017/069245 | 4/2017 |
| WO | WO 2017/147412 | 8/2017 |
| WO | WO 2018/110838 | 6/2018 |
| WO | WO 2019/043696 | 3/2019 |

OTHER PUBLICATIONS

Zhang et al. (Fast adaptive modeling method for build time estimation in Additive Manufacturing, CIRP Journal of Manufacturing Science and Technology 10 (2015) 49-60) (Year: 2015).*

Fahraz Ali et al; Influence of some process parameters on building time, material consumption and surface roughness of FDM processed parts: Interferences based on the Taguchi Design of Experiments; 2008 IAJC-IJME International Conference on Engineering & Technology, Globalization of Technology—Imagine the possibilities, Nov. 17-19, 2008, Music City Sheraton, Nashville, TN, USA, Sep. 25, 2014.

Angelo Luca et al; A build time estimator for additive manufacturing; 2019 II Workshop on Metrology for Industry 4.0 and IOT, IEEE, Jun. 4, 2019.

Yicha Zhang et al; Fast adaptive modeling method for build time estimation in additive manufacturing; CIRP Journal of Manufacturing Science and Technology; vol. 10; Aug. 1, 2015.

International Search Report dated Oct. 8, 2020 for corresponding Application No. PCT/IL2020/050650.

International Preliminary report on Patentability dated Dec. 23, 2021 for corresponding application No. PCT/IL2020/050650.

* cited by examiner

300

310 Receiving a 3D model of a tray arrangement including one or more 3D objects to be printed using a 3D printing system

312 Generating a 3D digital dataset including a plurality of data elements arranged in a set of horizontal slices, wherein a slicing resolution of the 3D digital dataset is lower as compared to a printing resolution of the 3D printing system

314 Predetermining the slicing resolution of the 3D digital dataset based on at least one of: a minimum calculation accuracy, a time required to perform the calculations thereof, a number and/or a complexity of 3D objects

316 Presetting the slicing resolution of the 3D digital dataset to a predetermined slicing resolution value

320 Calculating an amount of material consumption of one or more materials required for printing the tray arrangement of 3D object(s), based on the 3D digital dataset

322 Associating each of at least some data elements of each of the slices of the 3D digital dataset with one or more materials to be deposited to form the respective data element

324 Counting, for each of the slices of the 3D digital dataset and for each of the material(s), a number of data elements associated with respective material in the respective slice

326 Calculating, for each of the material(s), a total number of data elements associated with the respective material in the entire 3D digital dataset

```
328 — Calculating, for each of the material(s), a total calculated number of data elements to be associated/deposited with the respective material when printing the tray arrangement using the 3D printing system at the printing resolution 329 — Calculating the amount of each of the material(s) consumption required for printing the entire tray arrangement based on the calculated total number of data elements to be associated/deposited with the respective material and based on specified parameters of the material thereof 330 — Calculating a printing time required for printing the tray arrangement of 3D object(s) based on the 3D digital dataset having the slicing resolution and based on at least one set of printing parameters 332 — Calculating, for each slice of the 3D digital dataset, a printing time required for printing the respective slice based on the data elements of the respective slice and a first set of printing parameters 334 — Calculating the printing time required to print the entire tray arrangement of 3D object(s) based on the calculated times required for printing all of the slices of the 3D digital dataset 340 — Calculating and/or updating the amount of material(s) consumption and/or the printing time required to print the entire tray arrangement of 3D object(s) based on the entire 3D digital dataset and a second set of printing parameters 350 — Displaying/reporting the calculated amount of material(s) consumption and/or displaying/reporting the calculated printing time required to print the entire tray arrangement of 3D object to a user
```

*Fig. 3 (cont. 1)*

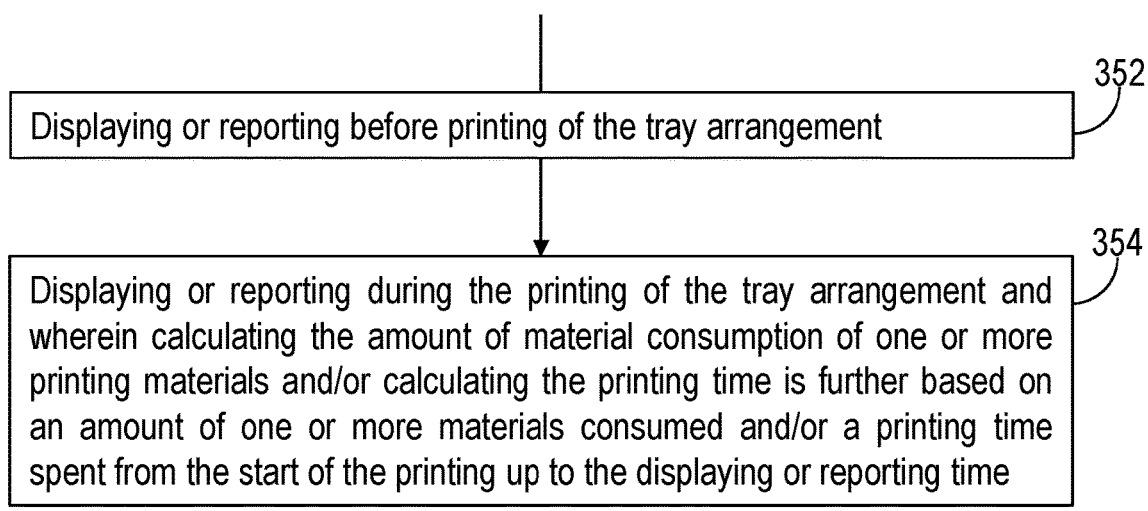
Fig. 3 (cont. 2)

SYSTEMS AND METHODS FOR CALCULATING A TIME DURATION AND AN AMOUNT OF MATERIAL REQUIRED FOR PRINTING A THREE-DIMENSIONAL OBJECT

CROSS-REFERENCE TO RELATED APPLICATIONS

This application is a National Phase Application of PCT International Application No. PCT/IL2020/050650, International Filing Date Jun. 11, 2020, claiming the benefit of U.S. Patent Application No. 62/860,873, filed Jun. 13, 2019, which is hereby incorporated by reference.

FIELD OF THE INVENTION

The present invention relates to the field of three-dimensional (3D) inkjet printing and, more particularly, to systems and methods for calculating a time duration and an amount of material required for printing a tray arrangement including one or more 3D objects using a 3D printing system.

BACKGROUND OF THE INVENTION

In three-dimensional (3D) inkjet printing of a 3D object, material is selectively jetted from one or more print heads and deposited onto a fabrication tray in consecutive layers according to a pre-determined configuration as defined by a software file. Some deposition processes include depositing different materials in order to form a single object or model. For example, a 3D object may be manufactured by depositing a first material to form the body structure and a second material to form a support structure under various sections of the body structure, for example, negative angle surfaces and overhangs. The support structure is later removed by mechanical, chemical or other means to reveal the final object.

The printing of 3D object(s) may be time consuming and may require significant amounts of material. Therefore, there is a need for a rapid and accurate method of determining a time duration and/or an amount of material required for printing a 3D object(s) before the actual printing is carried out and/or during printing.

SUMMARY OF THE INVENTION

Some embodiments of the present invention may provide a method of calculating a printing time duration and/or an amount of material consumption for one or more materials required for printing a tray arrangement comprising one or more 3D objects using a 3D printing system, the method comprising: receiving a 3D model of a tray arrangement including one or more 3D objects to be printed using a 3D printing system; generating, based on the 3D model, a 3D digital dataset comprising a plurality of data elements arranged in a set of horizontal slices, wherein a slicing resolution of the 3D digital dataset is lower than a printing resolution of the 3D printing system; and at least one of: (i) calculating an amount of material consumption of one or more printing materials required for printing the tray arrangement, based on the 3D digital dataset; and (ii) calculating a printing time required for printing the tray arrangement based on the 3D digital dataset and at least one set of printing parameters.

In some embodiments, the slicing resolution of the 3D digital dataset is between 100 µm×100 µm×100 µm and 1 mm×1 mm×1 mm.

In some embodiments, the printing resolution is higher than 100 µm×100 µm×100 µm.

In some embodiments, the method further comprising predetermining the slicing resolution of the 3D digital dataset based on at least one of: a minimum calculation accuracy for the printing time duration; a minimum calculation accuracy for the amount of material consumption; a time required to perform the calculation of the printing time duration and/or of the amount of material consumption; a number of 3D objects comprised in the tray arrangement; and a complexity of the one or more 3D objects.

In some embodiments, calculating the amount of material consumption of one or more printing materials comprises: (a) associating at least some data elements of the 3D digital dataset with a printing material; (b) calculating, for each of the one or more printing materials, a total number of data elements in the 3D digital dataset associated with the respective printing material; (c) calculating, for each of the one or more printing materials, a total number of data elements associated with the respective printing material at the printing resolution, based on step (b) and on a predetermined resolution factor; and (d) calculating the amount of printing material consumption for each of the one or more materials, based on step (c) and a specified parameter of the respective printing material; wherein the predetermined resolution factor is a ratio of the slicing resolution of the 3D digital dataset over the printing resolution.

In some embodiments, the ratio of the slicing resolution of the 3D digital dataset over the printing resolution is between 2 and 25,000, 10 and 10,000, 20 and 5,000 or 50 and 2,000.

In some embodiments, the specified parameter of the respective printing material is a material density.

In some embodiments, calculating the printing time comprises: (a) calculating, for each slice of the 3D digital dataset, a printing time required for printing the respective slice based on the data elements of the respective slice and a first set of printing parameters; and (b) calculating the printing time required to print the entire tray arrangement based on the calculated times required for printing all of the slices of the 3D digital dataset; wherein the first set of printing parameters comprises at least one of: a number of print heads of the 3D printing system; a localization of each print head in the printing 3D printing system; a geometry of the print heads; a width of the print heads, a number of nozzles in the print heads; a number of channels in the print heads; a relative offset between the print heads; a speed/acceleration of the printing unit; a relative movement of each printhead; a number of printing passes of width of the printing unit/print head; a number of travels of the printing unit/print head per pass; a starting/ending position of the printing unit on the printing tray before and/or after each travel; and curing times of each of the one or more materials to be deposited.

In some embodiments, calculating the amount of material consumption of one or more printing materials and/or calculating the printing time is further based on a second set of printing parameters comprising at least one of: a scattering policy; an interlacing policy; a purging/cleaning policy; a spitting policy; a printing mode/quality; and a printing of a reference model.

In some embodiments, the method further comprising displaying or reporting at least one of: the calculated amount of material consumption of one or more materials and the calculated printing time required for printing the tray arrangement.

In some embodiments, the displaying or reporting is performed before printing of the tray arrangement.

In some embodiments, the displaying or reporting is performed during the printing of the tray arrangement and wherein calculating the amount of material consumption of one or more printing materials and/or calculating the printing time is further based on an amount of one or more materials consumed and/or a printing time spent from the start of the printing up to the displaying or reporting time.

Some embodiments of the present invention may provide a system for calculating a printing time duration and an amount of material consumption for one or more materials required for printing a tray arrangement comprising one or more 3D objects using a 3D printing system, the system comprising: a slicing module configured to: receive a 3D model of a tray arrangement comprising one or more 3D objects to be printed using a 3D printing system; and generate, based on the 3D model, a 3D digital dataset comprising a plurality of data elements arranged in a set of horizontal slices, wherein a slicing resolution of the 3D digital dataset is lower than a printing resolution of the 3D printing system; and at least one of: a material consumption calculation module configured to calculate an amount of material consumption of one or more materials required for printing the tray arrangement, based on the 3D digital dataset; and a printing time calculation module configured to calculate a printing time required for printing the tray arrangement based on the 3D digital dataset and at least one set of printing parameters.

In some embodiments, the slicing resolution of the 3D digital dataset is between 100 μm×100 μm×100 μm and 1 mm×1 mm×1 mm.

In some embodiments, the printing resolution is higher than 100 μm×100 μm×100 μm.

In some embodiments, the slicing module is further configured to determine the resolution of the 3D digital dataset based on at least one of: a minimum calculation accuracy for the printing time duration; a minimum calculation accuracy for the amount of material consumption; a time required to perform the calculation of the printing time duration and/or of the amount of material consumption; a number of 3D objects comprised in the tray arrangement; and a complexity of the one or more 3D objects.

In some embodiments, the material consumption calculation module is further configured to: (a) associate at least some data elements of the 3D digital dataset with a printing material; (b) calculate, for each of the one or more printing materials, a total number of data elements in the 3D digital dataset associated with the respective printing material; (c) calculate, for each of the one or more printing materials, a total number of data elements associated with the respective printing material at the printing resolution, based on step (b) and on a predetermined resolution factor; and (d) calculate the amount of printing material consumption for each of the one or more materials, based on step (c) and a specified parameter of the respective printing material; wherein the predetermined resolution factor is a ratio of the slicing resolution of the 3D digital dataset over the printing resolution.

In some embodiments, the ratio of the slicing resolution of the 3D digital dataset over the printing resolution is between 2 and 25,000, 10 and 10,000, 20 and 5,000 or 50 and 2,000.

In some embodiments, the specified parameter of the respective printing material is a material density.

In some embodiments, the printing time calculation module is further configured to: (a) calculate, for each slice of the 3D digital dataset, a printing time required for printing the respective slice based on the data elements of the respective slice and a first set of printing parameters; and (b) calculate the printing time required to print the entire tray arrangement based on the calculated times required for printing all of the slices of the 3D digital dataset; wherein the first set of printing parameters comprises at least one of: a number of print heads of the 3D printing system; a localization of each print head in the printing 3D printing system; a geometry of the print heads; a width of the print heads, a number of nozzles in the print heads; a number of channels in the print heads; a relative offset between the print heads; a speed/acceleration of the printing unit; a relative movement of each printhead; a number of printing passes of width of the printing unit/print head; a number of travels of the printing unit/print head per pass; a starting/ending position of the printing unit on the printing tray before and/or after each travel; and curing times of each of the one or more materials to be deposited.

In some embodiments, the material consumption calculation module and/or the printing time calculation module are further configured to effect their calculation based on a second set of printing parameters comprising at least one of: a scattering policy; an interlacing policy; a purging/cleaning policy; a spitting policy; a printing mode/quality; and a printing of a reference model.

In some embodiments, the system further comprising a displaying/reporting module configured to display/report at least one of: the calculated amount of material consumption of one or more materials; and the calculated printing time required for printing the tray arrangement.

In some embodiments, the displaying/reporting module is configured to display/report before printing of the tray arrangement.

In some embodiments, the displaying/reporting module is configured to display/report during the printing of the tray arrangement and wherein the displayed amount of material consumption of one or more printing materials and/or the display of the printing time is further based on an amount of one or more materials consumed and/or a printing time spent from the start of the printing up to the display/report time.

These, additional, and/or other aspects and/or advantages of the present invention are set forth in the detailed description which follows, possibly inferable from the detailed description, and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings:

FIG. 3 is a flowchart of a method of calculating a printing time duration and/or an amount of material consumption for one or more materials required for printing a tray arrangement including one or more 3D objects using a 3D printing system, according to some embodiments of the invention.

Figure 1:
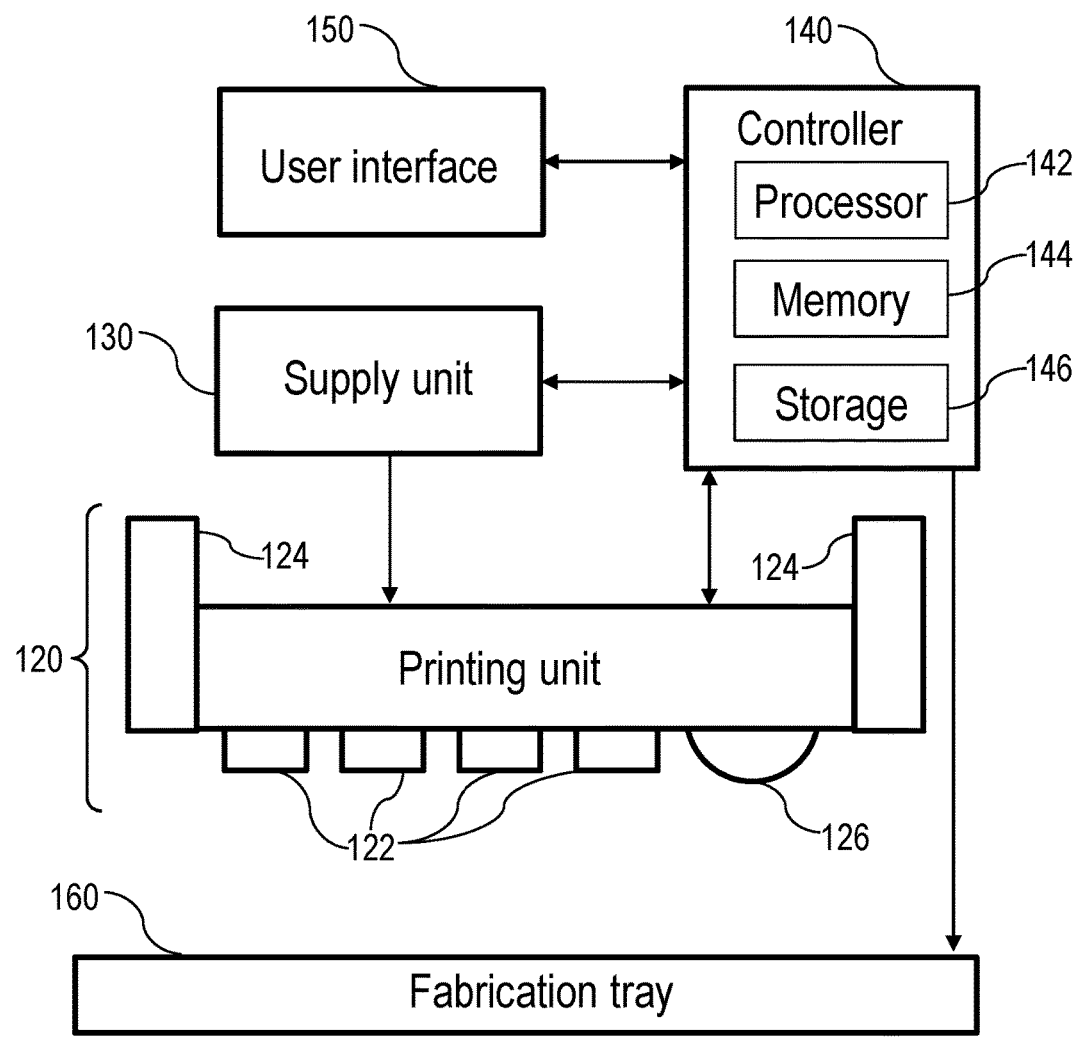
FIG. 1 is a schematic illustration of a 3D printing system for printing 3D objects, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Reference is now made to FIG. 1, which is a schematic illustration of a 3D printing system 100 for printing 3D objects, according to some embodiments of the invention.

According to some embodiments, 3D printing system 100 may include a printing unit 120, a supply unit 130, a controller 140, a user interface 150 and a fabrication tray 160. Controller 140 may be configured to control all elements of 3D printing system 100.

According to some embodiments, printing unit 120 may include one or more print heads 122, one or more hardening subunits 124, and one or more leveling subunits 126. Print heads 122 may be adapted to deposit material using any ink-jet method. Printing unit 120 may move horizontally in both X and Y directions and optionally also vertically in the Z direction above a square or rectangular fabrication tray 160. In some other embodiments, printing unit 120 is moving radially above a circular fabrication tray 160. In some further embodiments, some or all of the elements constituting printing unit 160 (i.e. leveling subunit 126, hardening unit 124, print heads 122) are mounted at distinct locations of printing system 100 and can be either static or mobile. In some embodiments, the fabrication tray is static and in some other embodiments the fabrication tray is mobile, e.g. a rotary fabrication tray, or moving in the X, Y and/or Z directions.

Each print head 122 may deposit one or more materials, such that at least two materials may be deposited in a single deposition scan. Print head(s) 122 may be fed with the material(s) supplied by supply unit 130. As known in the art, the term "print head" or "3D printing head" refer to a hardware component that is suitable to dispense 3D printing material at a predefined position. Implementations of commercially available 3D printing heads may include a single channel (e.g., hold a single type or color of printing material) or a multiple channel (e.g., hold one or more types or colors of printing materials).

Hardening subunit(s) 124 may include any device that is adapted to emit light, heat and the like that may cause the printed material to harden. For example, hardening subunit(s) 124 may include one or more ultraviolet (UV) lamps (e.g., mercury lamp, UV LED assembly) for curing the deposited material.

Leveling subunit 126 may include any device that may be configured to level and/or control the thickness and/or flatness of the newly formed layer by sweeping over the layer and removing excess material. For example, leveling subunit 126 may be a roller. Leveling subunit 126 may include a waste collection device (not shown) for collecting the excess material generated during the leveling process.

Supply unit 130 may include one or more material containers or cartridges for supplying the material(s) to print head(s) 122.

Controller 140 may include a processor 142, a memory 144 and a storage 146. Processor 142 may, for example, control the movement of printing unit 120 in a desired direction. Memory 144 may, for example, include an executable code. The executable code may include codes or instructions for controlling 3D printing system 100 to print 3D objects according to embodiments of the present invention. Storage 146 may store files that include design parameters of the 3D objects and the corresponding support structures to be printed by 3D printing system 100.

User interface 150 may be or may include input devices such as a mouse, a keyboard, a touch screen or pad or any suitable input devices and output devices. User interface 50 may allow a user to upload or update codes and instructions for controlling printing of 3D objects according to some embodiments of the invention and/or to upload and update files including the design of the 3D objects (e.g., computer aided design (CAD) files) into storage 146.

Fabrication tray 160 may be any tray, building or printing surface that is suitable to bear 3D objects and their corresponding support constructions as they are being printed, e.g., fabricated. Fabrication tray 160 may be attached, connected to or comprise an X-Y table and may be controlled, e.g., by controller 140, to move in the Z direction and/or optionally in the X-Y plane according to the requirements of the printing process. In some other embodiments, fabrication tray 160 is a circular tray configured to rotate around a central axis and to optionally move in the Z direction.

Typically, 3D printing systems (such as 3D printing system 100 described above with respect to FIG. 1), and especially commercial 3D printing systems, may be capable of printing a tray arrangement including several 3D objects during a single print cycle. In some cases, the printing of the tray arrangement with several 3D objects may be time consuming. For example, several hours or a few days may be necessary to print the tray arrangement. The printing of the tray arrangement with several 3D objects may also require a significant amount of material. Accordingly, there is a need for a method of calculating a time duration and/or an amount of material consumption required for printing the tray arrangement with one or more 3D objects in a rapid and accurate manner.

Figure 2:
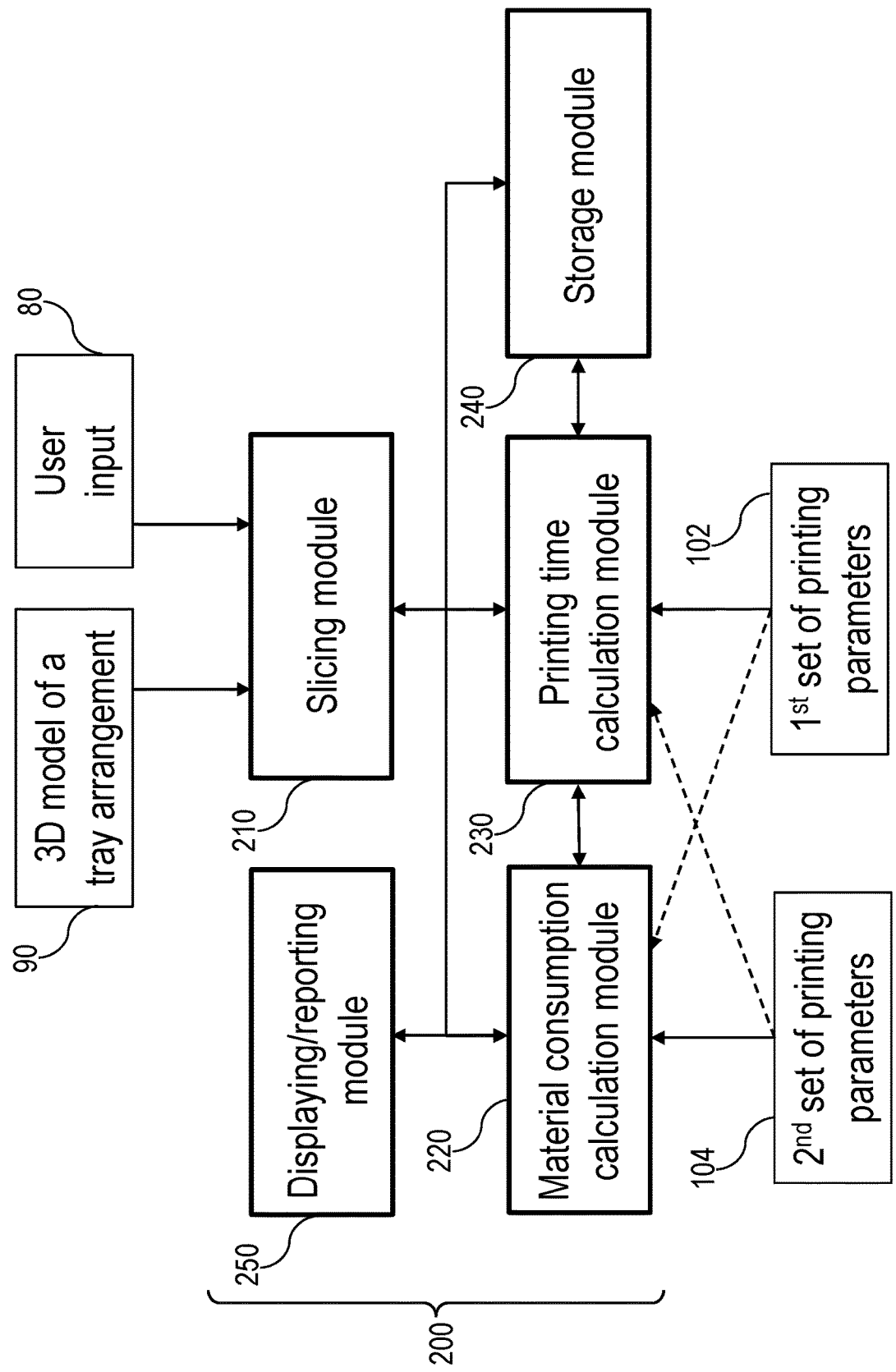
FIG. 2 is a schematic block diagram of a system for calculating a printing time duration and/or an amount of material consumption for one or more materials required for printing a tray arrangement including one or more 3D objects using a 3D printing system, according to some embodiments of the invention.

Reference is now made to FIG. 2, which is a schematic block diagram of a system 200 for calculating a printing time duration and/or an amount of material consumption for one or more materials required for printing a tray arrangement including one or more 3D objects using a 3D printing system, according to some embodiments of the invention.

According to some embodiments, system 200 may include a slicing module 210, a material consumption calculation module 220, a printing time calculation module 230 and a storage module 240. Slicing module 210, material consumption calculation module 220, printing time calculation module 230 and storage module 240 may be in communication with each other (e.g., as shown in FIG. 2).

According to some embodiments, slicing module 210 may be configured to receive a 3D model 90 of a tray arrangement including one or more 3D objects or an assembly of 3D object(s) parts to be printed using a 3D printing system. The 3D model may be provided as one or more files in, for example, a STL, VRML, OBJ or 3MF format. The 3D printing system may be similar to, for example, 3D printing system 100 described above with respect to FIG. 1.

Slicing module 210 may be configured to generate, based on the 3D model, a 3D digital dataset including a plurality of data elements. The 3D digital dataset may include a set of slices (e.g., horizontal slices) each including a portion of the plurality of data elements, e.g., pixels or voxels. The data elements of the 3D digital dataset may describe material positioning in the three-dimensional space as well as a geometry of the tray arrangement to be printed, including the geometry of the 3D object(s), 3D object(s) parts and/or one or more support structures.

In some embodiments, at least some of the data elements of the 3D digital dataset may be associated with at least one digital intensity value. For example, each of the at least some data elements may be associated with a single digital intensity value for monochrome 3D object(s). In another example, each of the at least some data elements may be associated with three or more digital intensity values for color and/or patterned 3D object(s).

The 3D digital dataset may be used to calculate a printing time duration and/or an amount (e.g., weight, volume, etc.) of consumption for one or more materials required for printing the tray arrangement of 3D object(s) using the 3D printing system.

Typically, 3D printing systems are capable of printing 3D object(s) at one or more printing resolutions. For example, printing resolutions may be 40 μm×80 μm×27 μm or 40 μm×80 μm×13 μm. Using one of the printing resolutions to generate a 3D digital dataset representing the tray arrangement of 3D object(s) to be printed may, for example, result in a dataset having a size of between 0.5-1 TB. Performing calculations (e.g., calculating printing time duration and/or an amount of material(s) consumption required for printing the tray arrangement) on such 3D digital dataset generated using one of the printing resolutions may require significant computational resources and may be time consuming.

It has been found by the inventors that generating a 3D digital dataset with slicing module 210 using a slicing resolution of the 3D digital dataset (e.g., defined by a size and number of the data elements in the 3D digital dataset) which is lower than the printing resolution of the 3D printing system may be advantageous as it enables obtaining a faster calculation of the printing time duration and/or the amount of material(s) consumption with an accuracy of at least about 90%. For example, for a printing resolution of 40 μm×80 μm×27 μm, the slicing resolution of the 3D digital dataset may be selected between 100 μm×100 μm×100 μm and 1 mm×1 mm×1 mm, for example 500 μm×500 μm×500 μm. Accordingly, the file data size of a 3D digital dataset generated at the above slicing resolution may be about 10 to about 10,000 folds smaller, for example about 1,500 folds smaller, as compared to a 3D digital dataset generated at the printing resolution. For example, the file data size of the 3D digital dataset generated at the above slicing resolution may range between 0.5-1 GB while the same file would range between 0.5-1 TB if generated at the printing resolution.

In various embodiments, the slicing resolution used for generating the 3D digital dataset with slicing module 210 may be selected based on a number and/or a complexity of the 3D object(s) to be printed (e.g., geometric shape, size, number of materials used), a minimum calculation accuracy (e.g., at least 80%, 85%, or 90%) and/or a time required to perform said calculations (e.g., less than 30, 20 or 10 mins). For instance, a tray arrangement comprising a large number of 3D objects to be printed would require a longer calculation time for determining the printing time duration and/or material consumption, and in such a case, it may be advantageous to reduce the minimum calculation accuracy so as to reduce the calculation time. On the other hand, if a tray arrangement comprises 3D objects having relatively simple geometric shapes (e.g. based on cubes, spheres) or are composed of a low number of materials (e.g. one modeling material and one support material), the minimum calculation accuracy may be increased as the calculation time would not be substantially affected.

For example, it was found that calculating a printing time duration and/or an amount of material(s) consumption of a tray arrangement including a 3D object having a dimension of about 10 cm×10 cm×10 cm (including support structures) would take about 1 h with close to 100% accuracy if generating a 3D digital dataset via slicing module 210 with a resolution similar to the printing resolution (e.g., 40 μm×80 μm×27 μm), while said calculation takes less than 5 mins with at least 95% accuracy if generating a 3D digital dataset with a slicing resolution of 500 μm×500 μm×500 μm.

In some embodiments, slicing module 210 may be configured to receive a user input 80 and to predetermine the slicing resolution for generating the 3D digital dataset (e.g., prior to actual generation thereof) based on user input 80. For example, user input 80 may include a user-defined minimal calculation accuracy for the printing time and/or for the amount of material(s) consumption and a user-defined maximal time for performing the calculations thereof as defined by a user/costumer. Yet in this example, slicing module 210 may be configured to determine the slicing resolution for generating the 3D digital dataset based on the user-defined minimal calculation accuracy and the user-defined maximal time for performing the calculations thereof.

In some other embodiments, slicing module 210 may be configured to preset the slicing resolution for generating the 3D digital dataset (e.g., prior to actual generation thereof) to a predetermined/default slicing resolution value. The predetermined slicing resolution value may be, for example, 500 µm×500 µm×500 µm.

In some embodiments, slicing module 210 may be configured to deliver the slices of the 3D digital dataset to storage module 240 that may be configured to store the slices thereof.

In some embodiments, slicing module 210 may be configured to receive a 3D digital dataset including a set of slices (e.g., BMP, PNG files) and having one of the printing resolutions of the 3D printing system. In these embodiments, slicing of the 3D digital dataset is not required and slicing module 210 may be configured to merely decrease the resolution of the received 3D digital dataset to generate a 3D digital dataset at a default (or user based) slicing resolution which is lower than the printing resolution (e.g., as described above with respect to FIG. 2).

According to some embodiments, system 200 may include a material consumption calculation module 220. Material consumption calculation module 220 may be configured to calculate an amount of material consumption of one or more materials required for printing the tray arrangement of 3D object(s), based on the 3D digital dataset.

In some embodiments, material consumption calculation module 220 may be configured to associate each of at least some data elements of each of the slices of the 3D digital dataset with one or more materials to be deposited to form the respective data element. The one or more materials may be, for example, one or more building materials and/or a supporting material. The association may be at least partly based on the digital intensity value(s) associated with each of the at least some data elements of the 3D digital dataset.

In some embodiments, material consumption calculation module 220 may be configured to count, for each of the slices of the 3D digital dataset and for each of the material(s), the number of data elements associated with the respective material in the respective slice. The values of the counted number of data elements associated with each of the material(s) in each of the slices may be stored in storage module 240.

In some embodiments, material consumption calculation module 220 may be configured to calculate, for each of the material(s), a total number of data elements associated with the respective material in the entire 3D digital dataset, based on the counted numbers of data elements associated with the respective material in all of the slices of the 3D digital dataset.

In some embodiments, material consumption calculation module 220 may be configured to calculate, for each of the material(s), a total number of data elements to be associated/deposited with the respective material when printing the tray arrangement of 3D object(s) on a 3D printing system at a predetermined printing resolution, based on the respective total number of data elements associated with the respective material (e.g., calculated based on the 3D digital dataset with a slicing resolution that is lower than the printing resolution) and based on a predetermined resolution factor.

The predetermined resolution factor may be, for example, a ratio of the slicing resolution of the 3D digital dataset over the printing resolution of the 3D printing system. In this example, the calculated total number of data elements to be associated/deposited with each of the material(s) when printing the tray arrangement of 3D object(s) at the printing resolution may be calculated by multiplying the total number of data elements associated with the respective material (e.g., calculated based on the 3D digital dataset at a slicing resolution that is lower than the printing resolution) by the resolution factor. For instance, if considering a printing resolution of 40×80×27 (µm) and a slicing resolution of the 3D digital dataset of 500×500×500 (µm), the predetermined resolution factor is about 1447. In other words, each data element of the 3D digital dataset generated at the above slicing resolution represents about 1447 data elements of a 3D digital dataset that would have been generated at a printing resolution. Typically, a resolution factor may be comprised between 2 and 25,000, 10 and 10,000, 20 and 5,000 or 50 and 2,000. The resolution factor would typically depend on the calculation accuracy and/or calculation time chosen by the user or set as a default parameter (e.g. in slicing module 210).

In some embodiments, material consumption module 220 may be configured to calculate the consumption amount of each of the material(s) required for printing the entire tray arrangement of 3D object(s) based on the calculated total number of data elements to be associated/deposited with the respective material and based on specified parameters of the material thereof (e.g. density, drop size, drop weight, viscosity, surface tension).

According to some embodiments, system 200 may include a printing time calculation module 230. Printing time calculation module 230 may be configured to calculate a printing time required for printing the tray arrangement of 3D object(s) based on the 3D digital dataset and based on at least one set of printing parameters of the 3D printing system.

In some embodiments, printing time calculation module 230 may be configured to calculate a printing time, for each slice of the 3D digital dataset, based on the data elements of the respective slice and a first set 102 of printing parameters. The values of calculated printing time required for printing each of the slices of the 3D digital dataset may be stored in storage module 140.

First set 102 of printing parameters may, for example, include (i) the number of print heads available in the 3D printing system, (ii) the localization of each print head in the printing unit/printing system, (iii) the geometry of each print head (e.g., width, number of nozzles, number of channels and relative offset), (iv) the speed/acceleration of the printing unit, (v) the relative movement of single print heads, (vi) the number of printing passes (e.g. considering the width of the printing unit), (vii) the number of travels to be effected by the printing unit in each printing pass, (viii) the starting/ending position of the printing unit before and/or after each travel, (ix) curing time(s) of the material(s), (x) any other parameter that has a direct or indirect impact on the printing time, (xi) and any combination thereof. In various embodiments, first set 102 may include at least one of the printing parameters thereof or all the printing parameters thereof. It is noted that the more printing parameters of first set 102 that are taken into account when calculating the printing time, the more accurate the calculation will be.

In some embodiments, printing time calculation module 230 may be configured to calculate the printing time required to print the entire tray arrangement including one or more 3D object(s) based on the calculated times required for printing all of the slices of the 3D digital dataset.

In some embodiments, material consumption calculation module 220 may be configured to calculate the amount of material(s) consumption required to print a tray arrangement of 3D object(s), based on the 3D digital dataset and on a second set 104 of printing parameters. Second set 104 of printing parameters may include, for instance, (i) a scattering policy (e.g., adding material to compensate for missing nozzles), (ii) an interlacing policy (e.g., movement of the printing unit to increase the printing resolution), (iii) purging/cleaning policy (e.g., number of purging events and amount of purged material aiming at increasing print heads lifetime), (iv) a spitting policy (e.g., occasional spitting of material out of the print head during printing to prevent nozzle obstruction), (v) a printing mode/quality of the 3D printing system (e.g., related to material drop weight, layer thickness, jetting speed, printing resolution), (vi) printing of a reference model (e.g., reference wall or tower), (vii) any other parameter that has a direct or indirect impact material consumption, (viii) or any combination thereof. Each policy abovementioned defines the existence or absence of one or more events associated with the specific parameter to which they are associated, as well as the time and/or material used during such an event. For instance, the purging/cleaning policy defines a number of slices to be printed after which the printing unit/printing heads follows a purging/cleaning procedure. For instance, the purging/cleaning policy may define that after each set of 20 printed slices, the printing unit should be cleaned in a service station of the 3D printing system (not shown), thereby using 10 g of material per print head channel and spending about 15 seconds before the printing process is resumed. Similar reasoning may be applied to the other policies mentioned above. In various embodiments, second set 104 may include at least one of the printing parameters thereof or all the printing parameters thereof. It is noted that the more printing parameters of second set 104 that are taken into account when calculating the amount of material(s) consumption, the more accurate the calculation will be.

It should be noted that in some embodiments, some or all of parameters belonging to first set 102 of printing parameters which is principally used by printing time calculation module 230 may be taken into account by material consumption calculation module 220 to refine the calculation of the amount of material(s) consumption. Similarly, some or all of parameters belonging to second set 104 of printing parameters which is principally used by material consumption calculation module 220 may be taken into account by printing time calculation module 230 to refine the calculation of the printing time.

For example, 3D printing systems typically require multiple purging/cleaning cycles of the print heads during the 3D printing. Purging/cleaning cycles may include jetting the material(s) out of the print heads at a dedicated service station and typically may take some time to complete.

In this example, material consumption calculation module 220 may be configured to calculate, based on the digital dataset, a number of purging/cleaning cycles required during the printing of the tray arrangement of 3D object(s) in order to assess an amount of material(s) to be ejected from the print heads during the purging/cleaning cycles. This amount of material(s) may be used to calculate or refine the amount of material(s) required for printing the tray arrangement.

Yet, in this example, printing time calculation module 230 may be configured to determine, based on the entire digital dataset, a number of purging/cleaning cycles required during the printing of the tray arrangement of 3D object(s), calculate the time required to complete the determine number of purging/cleaning cycles thereof, and refine the calculation of the printing time required for printing the tray arrangement.

According to some embodiments, the calculation of the consumption amount of each of the material(s) based on a 3D digital dataset generated at a slicing resolution that is lower than the printing resolution may have an accuracy of at least 90%, at least 92%, at least 95% or at least 98% of the accuracy that would have been obtained with a 3D digital dataset generated at a printing resolution.

According to some embodiments, the calculation of the printing time based on a 3D digital dataset generated at a slicing resolution that is lower than the printing resolution may have an accuracy of at least 90%, at least 92%, at least 95% or at least 98% of the accuracy that would have been obtained with a 3D digital dataset generated at a printing resolution.

According to some embodiments, system 200 may include a displaying/reporting module 250 (e.g., as shown in FIG. 2). Displaying/reporting module 250 may be in communication with material consumption calculation module 220 and/or printing time calculation module 230. Displaying/reporting module 250 may be configured to display/report the calculated amount of material(s) consumption and/or to display/report the calculated printing time required to print the entire tray arrangement of 3D object(s), respectively, to a user. In some embodiments, displaying/reporting module 250 is configured to display (i) a calculated amount of material(s) consumption on a material basis (e.g., each of the used materials), (ii) a calculated amount of material(s) consumption on a material category basis (e.g., modeling material, support material), (iii) a calculated amount of material(s) consumption for all materials (e.g., total consumption), (iv) or any combination thereof. In some embodiments, displaying/reporting module 250 is configured to display a calculated amount of material consumption and/or a printing time before printing and/or during the printing operation. In the latter case, the calculations of the remaining material consumption and/or printing time may be readjusted by taking into consideration the actual material consumption and/or time already spent.

According to various embodiments, system 200 may be configured to calculate the amount of material(s) consumption only (e.g., using material consumption calculation module 220), to calculate the printing time only (e.g., using printing time calculation module 230) and/or to calculate both the amount of material(s) consumption and the printing time required to print the entire tray arrangement of 3D object(s).

According to various embodiments, each of slicing module 210, material consumption calculation module 220, printing time calculation module 230, storage module 240 and/or displaying/reporting module 250 may be implemented on its own computing device, a single (e.g., shared) computing device, or a combination of computing devices. In various embodiments, the communication between slicing module 210, material consumption calculation module 220, printing time calculation module 230, storage module 240 and/or displaying/reporting module 250 may be wired or wireless.

Reference is now made to FIG. 3, which is a flowchart of a method 300 of calculating a printing time duration and/or an amount of material consumption for one or more materials required for printing a tray arrangement including one or more 3D objects using a 3D printing system, according to some embodiments of the invention.

Method 300 may be implemented by system 200, which may be configured to implement method 300. It is noted that method 300 is not limited to the flowcharts illustrated in FIG. 3 and to the corresponding description. For example, in various embodiments, method 300 need not move through each illustrated box or stage, or in exactly the same order as illustrated and described.

According to some embodiments, method 300 may include receiving a 3D model of a tray arrangement including one or more 3D objects to be printed using a 3D printing system (stage 310).

In some embodiments, method 300 may include generating, based on the 3D model, a 3D digital dataset including a plurality of data elements arranged in a set of horizontal slices, wherein a slicing resolution of the 3D digital dataset is lower as compared to a printing resolution of the 3D printing system (stage 312).

For example, the generation of the 3D digital dataset may be performed by slicing module 210 of system 200 and the 3D digital dataset may be similar to the 3D digital dataset as described above with respect to FIG. 2.

In some embodiments, method 300 may include predetermining the slicing resolution of the 3D digital dataset (e.g., prior to the generation thereof) based on at least one of: a minimum calculation accuracy for the printing time duration and/or the amount of material consumption, a time required to perform the calculations of the printing time duration and/or the amount of material consumption, a number of 3D objects to be printed and/or a complexity of the 3D objects to be printed (stage 314) (e.g., as described above with respect to FIG. 2).

In some embodiments, method 300 may include presetting the slicing resolution of the 3D digital dataset (e.g., prior to the generation thereof) to a predetermined slicing resolution value (stage 316) (e.g., as described above with respect to FIG. 2). The predetermined slicing resolution value may be, for example, 500 µm×500 µm×500 µm.

According to some embodiments, method 300 may include calculating an amount of material consumption of one or more materials required for printing the tray arrangement of 3D object(s), based on the 3D digital dataset (stage 320).

For example, the calculation of the amount of material(s) consumption may be performed by material consumption calculation module 220 of system 200 as described above with respect to FIG. 2.

In some embodiments, method 300 may include associating each of at least some data elements of each of the slices of the 3D digital dataset with one or more materials to be deposited to form the respective data element (stage 322) (e.g., as described above with respect to FIG. 2).

In some embodiments, method 300 may include counting, for each of the slices of the 3D digital dataset and for each of the material(s), a number of data elements associated with a respective material in the respective slice (stage 324) (e.g., as described above with respect to FIG. 2).

In some embodiments, method 300 may include calculating, for each of the material(s), a total number of data elements associated with the respective material in the entire 3D digital dataset based on the respective numbers of data elements associated with the respective material in all of the slices of the 3D digital dataset (stage 326) (e.g., as described above with respect to FIG. 2).

In some embodiments, method 300 may include calculating, for each of the material(s), a total calculated number of data elements to be associated/deposited with the respective material when printing the tray arrangement of 3D object(s) using the 3D printing system at the printing resolution, based on the respective total number of data elements associated with the respective material (e.g., calculated based on the 3D digital dataset having a slicing resolution that is lower than the printing resolution) and based on a predetermined resolution factor (stage 328) (e.g., as described above with respect to FIG. 2). The predetermined resolution factor may be, for example, a ratio of the slicing resolution of the 3D digital dataset over the printing resolution of the 3D printing system.

In some embodiments, method 300 may include calculating the consumption amount of each of the material(s) required for printing the entire tray arrangement of 3D object(s) based on the calculated total number of data elements to be associated/deposited with the respective material when printing the tray arrangement of 3D object(s) at the printing resolution and based on specified parameters of the material thereof (stage 329) (e.g., as described above with respect to FIG. 2).

According to some embodiments, method 300 may include calculating a printing time required for printing the tray arrangement of 3D object(s) based on the 3D digital dataset having the slicing resolution and based on at least one set of printing parameters (stage 330).

For example, the calculation of printing time required for printing the tray arrangement of 3D object(s) may be performed by printing time calculation module 230 of system 200 as described above with respect to FIG. 2.

In some embodiments, method 300 may include calculating, for each slice of the 3D digital dataset, a printing time required for printing the respective slice based on the data elements of the respective slice and a first set of printing parameters (stage 332) (e.g., as described above with respect to FIG. 2).

The first set of printing parameters may be similar to first set 102 of printing parameters described above with respect to FIG. 2. For example, first set of printing parameters may include a number of print heads in the 3D printing system, a position of print heads in the printing unit, a geometry of the print heads (e.g., width, number of nozzles, number of channels and relative offset), a speed or acceleration of the printing unit, a number of passes per width of the printing unit, a number of travels of the printing unit per pass, curing time(s) of the material(s) to be deposited, etc.

In some embodiments, method 300 may include calculating the printing time required to print the entire tray arrangement including one or 3D object(s) based on the calculated times required for printing all of the slices of the 3D digital dataset (stage 334) (e.g., as described above with respect to FIG. 2).

According to various embodiments, method 300 may include at least one of calculating and updating at least one of the amount of material(s) consumption and the printing time required to print the entire tray arrangement of 3D object(s) based on the entire 3D digital dataset and based on a second set of printing parameters (stage 340) (e.g., as described above with respect to FIG. 2).

The second set of printing parameters may be similar to second set 104 of printing parameters described above with respect to FIG. 2. For example, the second set of printing parameters may include scattering policy, purging/cleaning policy, predetermined printing mode/quality of the 3D printing system, etc.

According to various embodiments, method 300 may include displaying or reporting the calculated amount of material(s) consumption and/or displaying or reporting the calculated printing time required to print the entire tray arrangement of 3D object to a user (stage 350) (e.g., by displaying/reporting module 250 of system 200 as described above with respect to FIG. 2).

In some embodiments, method 300 may include displaying or reporting before printing of the tray arrangement (stage 352).

In some embodiments, method 300 may include displaying or reporting during the printing of the tray arrangement and wherein calculating the amount of material consumption of one or more printing materials and/or calculating the printing time is further based on an amount of one or more materials consumed and/or a printing time spent from the start of the printing up to the displaying or reporting time (stage 354).

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method of calculating a printing time duration and/or an amount of material consumption for one or more materials required for printing a tray arrangement comprising one or more 3D objects using a 3D printing system, the method comprising:
    receiving a 3D model of a tray arrangement including one or more 3D objects to be printed using a 3D printing system;
    generating, based on the 3D model, a 3D digital dataset comprising a plurality of data elements arranged in a set of horizontal slices, wherein a slicing resolution of the 3D digital dataset is lower than a printing resolution of the 3D printing system; and
    at least one of:
        (i) calculating an amount of material consumption of one or more printing materials required for printing the tray arrangement, based on the 3D digital dataset; and
        (ii) calculating a printing time required for printing the tray arrangement based on the 3D digital dataset and at least one set of printing parameters; and displaying or reporting at least one of: the calculated amount of material consumption of one or more materials and the calculated printing time required for printing the tray arrangement,
wherein the displaying or reporting is performed during the printing of the tray arrangement; and
wherein calculating the amount of material consumption of one or more printing materials and/or calculating the printing time is further based on an amount of one or more materials consumed and/or a printing time spent from the start of the printing up to the displaying or reporting time.

2. The method of claim 1, wherein the slicing resolution of the 3D digital dataset is between 100 μm×100 μm×100 μm and 1 mm×1 mm×1 mm.

3. The method of claim 1, wherein the printing resolution is higher than 100 μm×100 μm×100 μm.

4. The method of claim 1, further comprising predetermining the slicing resolution of the 3D digital dataset based on at least one of: a minimum calculation accuracy for the printing time duration; a minimum calculation accuracy for the amount of material consumption; a time required to perform the calculation of the printing time duration and/or of the amount of material consumption; a number of 3D objects comprised in the tray arrangement; and a complexity of the one or more 3D objects.

5. The method of claim 1, wherein calculating the amount of material consumption of one or more printing materials comprises:
(a) associating at least some data elements of the 3D digital dataset with a printing material;
(b) calculating, for each of the one or more printing materials, a total number of data elements in the 3D digital dataset associated with the respective printing material;
(c) calculating, for each of the one or more printing materials, a total number of data elements associated with the respective printing material at the printing resolution, based on step (b) and on a predetermined resolution factor; and
(d) calculating the amount of printing material consumption for each of the one or more materials, based on step (c) and a specified parameter of the respective printing material;
wherein the predetermined resolution factor is a ratio of the slicing resolution of the 3D digital dataset over the printing resolution.

6. The method of claim 5, wherein the ratio of the slicing resolution of the 3D digital dataset over the printing resolution is between 2 and 25,000, 10 and 10,000, 20 and 5,000 or 50 and 2,000.

7. The method of claim 5, wherein the specified parameter of the respective printing material is a material density.

8. The method of claim 1, wherein calculating the printing time comprises:
(a) calculating, for each slice of the 3D digital dataset, a printing time required for printing the respective slice based on the data elements of the respective slice and a first set of printing parameters; and
(b) calculating the printing time required to print the entire tray arrangement based on the calculated times required for printing all of the slices of the 3D digital dataset;
wherein the first set of printing parameters comprises at least one of: a number of print heads of the 3D printing system; a localization of each print head in the printing 3D printing system; a geometry of the print heads; a width of the print heads, a number of nozzles in the print heads; a number of channels in the print heads; a relative offset between the print heads; a speed/acceleration of the printing unit; a relative movement of each printhead; a number of printing passes of width of the printing unit/print head; a number of travels of the printing unit/print head per pass; a starting/ending position of the printing unit on the printing tray before and/or after each travel; and curing times of each of the one or more materials to be deposited.

9. The method of claim 1, wherein calculating the amount of material consumption of one or more printing materials and/or calculating the printing time is further based on a second set of printing parameters comprising at least one of: a scattering policy; an interlacing policy; a purging/cleaning policy; a spitting policy; a printing mode/quality; and a printing of a reference model.

10. A system for calculating a printing time duration and an amount of material consumption for one or more materials required for printing a tray arrangement comprising one or more 3D objects using a 3D printing system, the system comprising:
a slicing module configured to:
receive a 3D model of a tray arrangement comprising one or more 3D objects to be printed using a 3D printing system; and
generate, based on the 3D model, a 3D digital dataset comprising a plurality of data elements arranged in a set of horizontal slices, wherein a slicing resolution of the 3D digital dataset is lower than a printing resolution of the 3D printing system; and
at least one of:
a material consumption calculation module configured to calculate an amount of material consumption of one or more materials required for printing the tray arrangement, based on the 3D digital dataset; and
a printing time calculation module configured to calculate a printing time required for printing the tray arrangement based on the 3D digital dataset and at least one set of printing parameters; and
a displaying/reporting module configured to display/report at least one of:
the calculated amount of material consumption of one or more materials; and
the calculated printing time required for printing the tray arrangement;
wherein the displaying/reporting module is configured to display/report during the printing of the tray arrangement; and
wherein the displayed amount of material consumption of one or more printing materials and/or the display of the printing time is further based on an amount of one or more materials consumed and/or a printing time spent from the start of the printing up to the display/report time.

11. The system of claim 10, wherein the slicing resolution of the 3D digital dataset is between 100 μm×100 μm×100 μm and 1 mm×1 mm×1 mm.

12. The system of claim 10, wherein the printing resolution is higher than 100 μm×100 μm×100 μm.

13. The system of claim 10, wherein the slicing module is further configured to determine the resolution of the 3D digital dataset based on at least one of: a minimum calculation accuracy for the printing time duration; a minimum calculation accuracy for the amount of material consumption; a time required to perform the calculation of the printing time duration and/or of the amount of material consumption; a number of 3D objects comprised in the tray arrangement; and a complexity of the one or more 3D objects.

14. The system of claim 10, wherein the material consumption calculation module is further configured to:
  (a) associate at least some data elements of the 3D digital dataset with a printing material;
  (b) calculate, for each of the one or more printing materials, a total number of data elements in the 3D digital dataset associated with the respective printing material;
  (c) calculate, for each of the one or more printing materials, a total number of data elements associated with the respective printing material at the printing resolution, based on step (b) and on a predetermined resolution factor; and
  (d) calculate the amount of printing material consumption for each of the one or more materials, based on step (c) and a specified parameter of the respective printing material;
  wherein the predetermined resolution factor is a ratio of the slicing resolution of the 3D digital dataset over the printing resolution.

15. The system of claim 14, wherein the ratio of the slicing resolution of the 3D digital dataset over the printing resolution is between 2 and 25,000, 10 and 10,000, 20 and 5,000 or 50 and 2,000.

16. The system of claim 14, wherein the specified parameter of the respective printing material is a material density.

17. The system of claim 10, wherein the printing time calculation module is further configured to:
  (a) calculate, for each slice of the 3D digital dataset, a printing time required for printing the respective slice based on the data elements of the respective slice and a first set of printing parameters; and
  (b) calculate the printing time required to print the entire tray arrangement based on the calculated times required for printing all of the slices of the 3D digital dataset;
  wherein the first set of printing parameters comprises at least one of: a number of print heads of the 3D printing system; a localization of each print head in the printing 3D printing system; a geometry of the print heads; a width of the print heads, a number of nozzles in the print heads; a number of channels in the print heads; a relative offset between the print heads; a speed/acceleration of the printing unit; a relative movement of each printhead; a number of printing passes of width of the printing unit/print head; a number of travels of the printing unit/print head per pass; a starting/ending position of the printing unit on the printing tray before and/or after each travel; and curing times of each of the one or more materials to be deposited.

18. The system of claim 10, wherein the material consumption calculation module and/or the printing time calculation module are further configured to effect their calculation based on a second set of printing parameters comprising at least one of: a scattering policy; an interlacing policy; a purging/cleaning policy; a spitting policy; a printing mode/quality; and a printing of a reference model.

* * * * *